(12) United States Patent
Ming

(10) Patent No.: US 9,965,695 B1
(45) Date of Patent: May 8, 2018

(54) DOCUMENT IMAGE BINARIZATION METHOD BASED ON CONTENT TYPE SEPARATION

(71) Applicant: KONICA MINOLTA LABORATORY U.S.A., INC., San Mateo, CA (US)

(72) Inventor: Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days. days.

(21) Appl. No.: 15/394,841

(22) Filed: Dec. 30, 2016

(51) Int. Cl.
*G06K 9/00* (2006.01)
*G06K 9/38* (2006.01)
*G06K 9/34* (2006.01)
*H04N 1/40* (2006.01)

(52) U.S. Cl.
CPC .......... *G06K 9/38* (2013.01); *G06K 9/00456* (2013.01); *G06K 9/342* (2013.01); *G06K 9/344* (2013.01); *H04N 1/40012* (2013.01); *G06K 2209/01* (2013.01)

(58) Field of Classification Search
CPC ...... G06K 9/38; G06K 9/00456; G06K 9/342; G06K 9/344; G06K 2209/01; H04N 1/40012
See application file for complete search history.

(56) References Cited

U.S. PATENT DOCUMENTS

| 5,243,445 | A  | * | 9/1993  | Koike ..................... H04N 1/40 |
|           |    |   |         | 358/461                               |
| 8,351,699 | B2 |   | 1/2013  | Li et al.                             |
| 9,251,614 | B1 | * | 2/2016  | Tian ..................... G06K 9/4604 |
| 2003/0107781 | A1 | * | 6/2003 | Ozawa ................. H04N 1/3871 |
|           |    |   |         | 358/506                               |
| 2004/0220898 | A1 | * | 11/2004 | Eguchi ............. G06F 17/30259 |
| 2005/0276519 | A1 | * | 12/2005 | Kitora ................... G06Q 10/10 |
|           |    |   |         | 382/305                               |
| 2005/0278624 | A1 | * | 12/2005 | Nishikawa ......... G06K 9/00442 |
|           |    |   |         | 715/249                               |
| 2007/0036468 | A1 | * | 2/2007  | Matsushita ....... G06F 17/30011 |
|           |    |   |         | 382/305                               |
| 2008/0008376 | A1 | * | 1/2008  | Andel ................ G06K 9/00463 |
|           |    |   |         | 382/141                               |
| 2010/0067023 | A1 | * | 3/2010  | Ito ............................ H04N 1/41 |
|           |    |   |         | 358/1.2                               |

(Continued)

*Primary Examiner* — Sean Motsinger
(74) *Attorney, Agent, or Firm* — Chen Yoshimura LLP

(57) ABSTRACT

A method for binarizing a grayscale document image, which first divides the document image into a plurality of sub-images and determining a type of each sub-image based on a horizontal projection profile and a density of each sub-image, the type being 1: text only, 2: graphics only, 3: photo only, 4: text and graphics, 5: text and photo, 6: graphics and photo, or 7: text and graphics and photo. Then a selected one of first to seventh binarization processes is applied to binarize each sub-image based on its type to generate a binary sub-image. All binary sub-images are then combine to generate a binary image of the grayscale document image. Of the first to seventh binarization processes respectively applied to the first to seventh types of sub-images, at least those for the first, second, third, fifth, sixth and seventh type are different from each other.

20 Claims, 8 Drawing Sheets

(56) References Cited

U.S. PATENT DOCUMENTS

| | | | |
|---|---|---|---|
| 2010/0082698 A1* | 4/2010 | Ito | G06F 17/30011 |
| | | | 707/802 |
| 2010/0157340 A1* | 6/2010 | Chen | G06K 9/00456 |
| | | | 358/1.9 |
| 2010/0253953 A1* | 10/2010 | Oota | H04N 1/3333 |
| | | | 358/1.9 |
| 2011/0044554 A1* | 2/2011 | Tian | G06T 5/003 |
| | | | 382/255 |
| 2012/0008174 A1* | 1/2012 | Sohma | G06K 9/00469 |
| | | | 358/448 |
| 2012/0120453 A1* | 5/2012 | Yu | H04N 1/40062 |
| | | | 358/3.06 |
| 2012/0274991 A1* | 11/2012 | Roy | H04N 1/387 |
| | | | 358/462 |
| 2013/0120790 A1* | 5/2013 | Yamada | H03M 7/48 |
| | | | 358/1.15 |
| 2013/0243321 A1* | 9/2013 | Shimazaki | G06K 9/46 |
| | | | 382/170 |
| 2014/0185933 A1* | 7/2014 | Tian | G06K 9/00577 |
| | | | 382/173 |
| 2015/0067456 A1* | 3/2015 | Kashibuchi | G06F 17/211 |
| | | | 715/201 |
| 2016/0300321 A1* | 10/2016 | Naya | G06K 9/00422 |
| 2017/0024629 A1* | 1/2017 | Thrasher | G06T 7/187 |
| 2018/0015750 A1* | 1/2018 | Ito | B41J 21/16 |

* cited by examiner

DOCUMENT IMAGE BINARIZATION METHOD BASED ON CONTENT TYPE SEPARATION

BACKGROUND OF THE INVENTION

Field of the Invention

This invention relates to binarization of grayscale document images, and in particular, it relates to a binarization method based on separation of content types.

Description of Related Art

A document image generally refers to an image that contains text content but may also contain other types of content such as graphics and/or photos. Document image binarization is the process of converting a color or grayscale document image into a binary (1 bit) image. Binarization is an important step in image processing for document images, where subsequent steps such as optical character recognition (OCR) are often applied to the binary image to extract and analyze text contained in the document. Many binarization algorithms are known, some using global thresholding approaches, some using local thresholding approaches. However, document images that contain other types of contents in addition to text, in particular photos, remain difficult to binarize with satisfactory results, either using a global or using a local thresholding approach, and the computation cost is usually high.

SUMMARY

The present invention is directed to a method and related apparatus for binarizing composite document images that contain multiple different types of contents such as text, graphics, photos, etc.

An object of the present invention is to provide a document image binarization method that separates different types of contents of a composite image and applies suitable binarization to different types of contents separately.

Another object of the present invention is to provide a document image binarization method that gives satisfactory result without high computation cost.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for binarizing a grayscale document image, which includes: (a) dividing the document image into a plurality of sub-images and determining a type of each sub-image, including: (a1) dividing the document image into a plurality of sub-images without regard to its content; for each sub-image: (a2) calculating a horizontal projection profile as a function of vertical pixel position, which represents either a number of pixels darker than a threshold darkness in each row of pixels of the sub-image or a sum or average of pixel values of each row of pixels; (a3) calculating a density of the sub-image, which represents either a ratio of a number of pixels darker than a threshold darkness to a total number of pixels in the sub-image or an average of pixel values of the sub-image; and (a4) based on the horizontal projection profile and the density, determining the sub-image as being one of: a first type which contains only text content, a second type which contains only graphics content, a third type which contains only photo content, a fourth type which contains only text and graphics contents, a fifth type which contains only text and photo contents, a sixth type which only contains graphics and photo contents, and a seventh type which contains text and graphics and photo contents; and (b) based on the type of each sub-image as determined in step (a), applying a selected one of first to seventh binarization processes to binarize the sub-image to generate a binary sub-image, the first to seventh binarization processes respectively adapted for binarizing sub-images of the first to seventh types, wherein at least the first, second, third, fifth, sixth and seventh binarization processes are different from each other; and (c) combining all binary sub-images to generate a binary image of the grayscale document image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 1A-9 schematically illustrate a document image binarization process according to an embodiment of the present invention, where FIGS. 1A and 1B illustrate the overall process flow, and FIGS. 2-9 illustrate various sub-processes of the overall process.

DETAILED DESCRIPTION OF PREFERRED EMBODIMENTS

Embodiments of the present invention provide a document image binarization method which uses a simple approach to identify different types of contents in a composite image, and then binarizes the different types of content separately, applying different processing steps for different types of content. The different types of contents include text (i.e. content formed of text characters), graphics (e.g., tables, charts, flow charts, line drawings, etc.), and photos which typically have rich color or grayscale pixel values. The goal of the binarization method is to correctly binarize the text and graphics contents; for photos, the emphasis is on extracting any text in the photos without attempting to correctly binarize the other parts of the photos.

According to embodiments of the present invention, the document image is divided into multiple regions (sub-images), and a determination is made regarding the content types of each sub-image, so that they can be suitably binarized. Moreover, multiple sub-images may be processed in parallel to increase performance. The method can binarize composite document images efficiently and effectively.

Figure 1A:
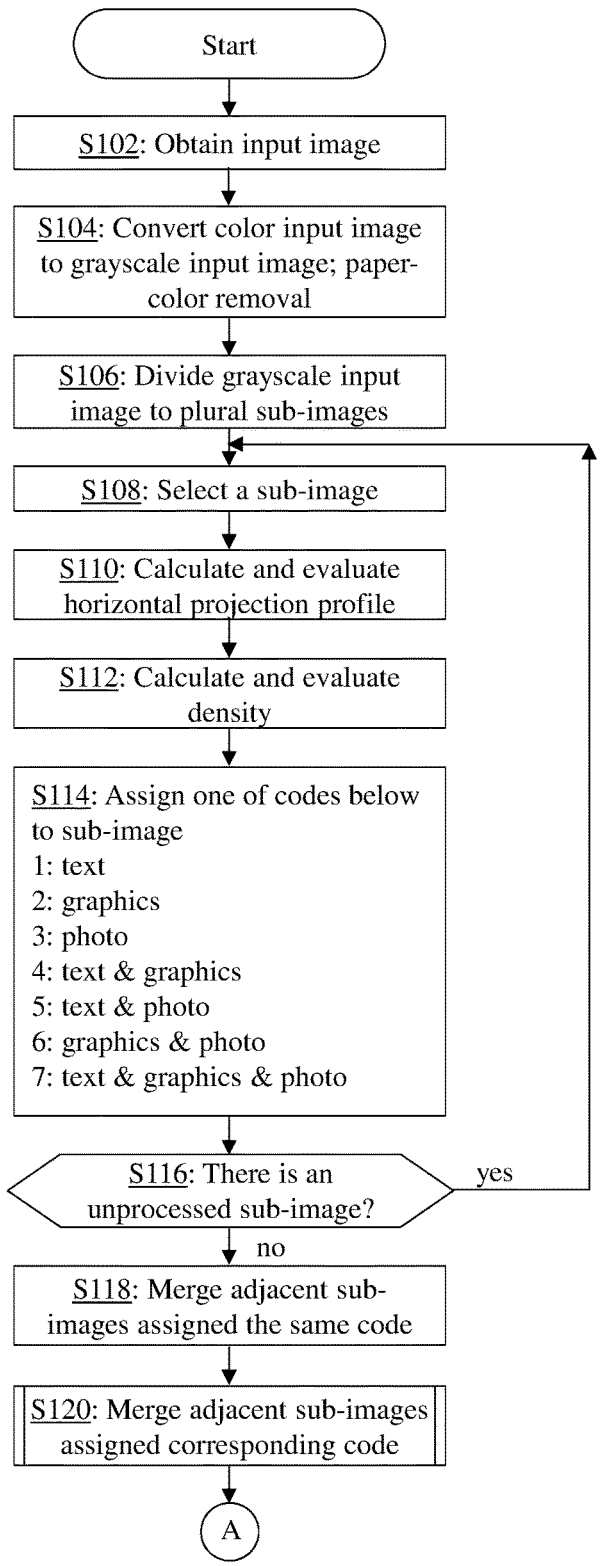

FIGS. 1A-9 schematically illustrate a document image binarization process according to an embodiment of the present invention. FIGS. 1A and 1B illustrate the overall process flow, and FIGS. 2-9 illustrate various sub-processes of the overall process.

As shown in FIG. 1A, an input image is obtained (step S102). The input image may be generated by, for example, scanning or photographing a hardcopy document. The input image may be a color or a grayscale image. If it is a color image, it is converted to a grayscale input image (step S104). The grayscale input image contains an array of pixels each having a multi-bit (e.g. 8-bit) pixel value.

As a part of step S104, a step is performed to change the pixel value of paper-color pixels to zero. More specifically, a threshold darkness is estimated by selecting multiple patches (ex. 7×7 pixels in size) of the image and calculating the average of their pixel values. The patches are preferably located at the four corners or within side borders of the page. Then, for the entire image, the pixel values that are lower than the threshold darkness are changed to 0.

The grayscale input image is divided into multiple sub-images (step S106). This step is a simple image division using a predetermined division pattern, without regard to the content of the image. For example, the input image may be divided into 2×2 equal sized sub-images, 3×2 sub-images, 3×1 sub-images, etc. Then, in steps S108-S116, each sub-image is examined to determine what type or types of content it contains. Each sub-images is categorized into one of the following seven types of sub-images based on the content types it contains: 1: text, 2: graphics, 3: photo, 4: text & graphics, 5: text & photo, 6: graphics & photo, and 7: text & graphics & photo (step 114). For example, if a sub-image is determined to only contain text, it is categorized as a type 1, text only; if a sub-image is determined to contain both text and graphics, it is categorized as a type 4, text & graphics; etc.

The above determination for each sub-image (step S114) is based on calculating and evaluating a horizontal projection profile (histogram) of the sub-image (step S110), and calculating and evaluating a density of the sub-image or parts thereof (step S112). The horizontal projection profile is calculated by counting the number of non-zero pixels (i.e. pixels above the threshold darkness) in each horizontal row of pixels of the sub-image. Thus, the horizontal projection profile is a function $H(y)$ where $y$ is the pixel position in the vertical direction. The horizontal projection profile for text content tends to have pulse-like peaks and low (close to zero) valleys between peaks, respectively corresponding to the lines of text and empty spaces between them, and the peaks and valleys tend to have substantially uniform widths respectively (i.e. the widths of most peaks are substantially the same (e.g. within 10% of each other), and the widths of most valleys are substantially the same (e.g. within 10% of each other)). On the other hand, for graphics and photos, the horizontal projection profile tends to be a relatively slow-varying curve without such clear pulse-like peaks and low valleys (referred to as a continuous profile in this disclosure).

The density of the sub-image or a part thereof is defined as the ratio of the number of non-zero pixels to the total number of pixels in the sub-image or the part. The density for text and graphics tend to be much lower than the density for photos, due to the presence of large empty spaces in text and graphics.

Here, for convenience of explanation, it is assumed that darker (foreground) pixels have higher pixel values; in actual computer implementation the opposite may be the case, and the determination criteria can be adapted accordingly.

In the determination step (step S114), if the horizontal projection profile of the sub-image has alternating pulse-like peaks and low (near-zero) valleys with approximately uniform widths respectively, and does not contain a part having a continuous curve, the sub-image is determined to contain text only and is assigned a code designating type 1 (text). This determination may be made without calculating and evaluating the density of the sub-image.

If the horizontal projection profile of the sub-image is a continuous curve without clear alternating pulse-like peaks and low valleys, and if the density of the sub-image is below a predetermined density threshold, e.g. 25%, then the sub-image is determined to contain graphics only and is assigned a code designating type 2 (graphics).

If the horizontal projection profile of the sub-image is a continuous curve without clear alternating pulse-like peaks and low valleys, and if the density of the sub-image is above the density threshold, then the sub-image is determined to contain photos only and is assigned a code designating type 3 (photo).

If the horizontal projection profile of the sub-image has a first portion that has alternating pulse-like peaks and low (near-zero) valleys with approximately uniform widths respectively, and a second portion that is a continuous curve without clear alternating pulse-like peaks and low valleys, then the sub-image contains text and also graphics or photo. The density of the part of the sub-image corresponding to the second (i.e. non-pulse-like) portion of the horizontal projection profile is calculated. If the density is below the density threshold, the sub-image is determined to contain both text and graphics but no photo, and is assigned a code designating type 4 (text & graphics). If the density is above the density threshold, the sub-image is determined to contain both text and photo but no graphics, and is assigned a code designating type 5 (text & photo).

If the horizontal projection profile of the sub-image does not have any portion that has alternating pulse-like peaks and low valleys, but has two distinctive portions that have significantly different heights, the sub-image is determined to contain both graphics and photo but no text, and is assigned a code designating type 6 (graphics & photo).

If the horizontal projection profile of the sub-image has a portion that has alternating pulse-like peaks and low (near-zero) valleys with approximately uniform widths respectively, and the remaining part of the horizontal projection profile has two distinctive portions that have significantly different heights, the sub-image is determined to contain text, graphics and photo, and is assigned a code designating type 7 (text & graphics & photo).

In an alternative embodiment, the horizontal projection profile is calculated by summing or averaging the grayscale pixel values of all pixels of each horizontal row. In another alternative embodiment, the density of a sub-image is calculated by averaging the grayscale pixel values over the sub-image. If such methods are used, the step of setting paper-color pixels to zero in step S104 is not necessary. The horizontal projection profile and density calculated this way still has the above described characteristics that can be used to determine the type of contents of the sub-image.

After each sub-image is processed and assigned a code designating its type, a merging step is performed where adjacent sub-images having the same code are merged into one sub-image (step S118). Further, another merging step is performed where adjacent sub-images having certain corresponding codes are merged into one sub-image (step S120). The details of step S120 is shown in detail in FIG. 2.

Figure 2:
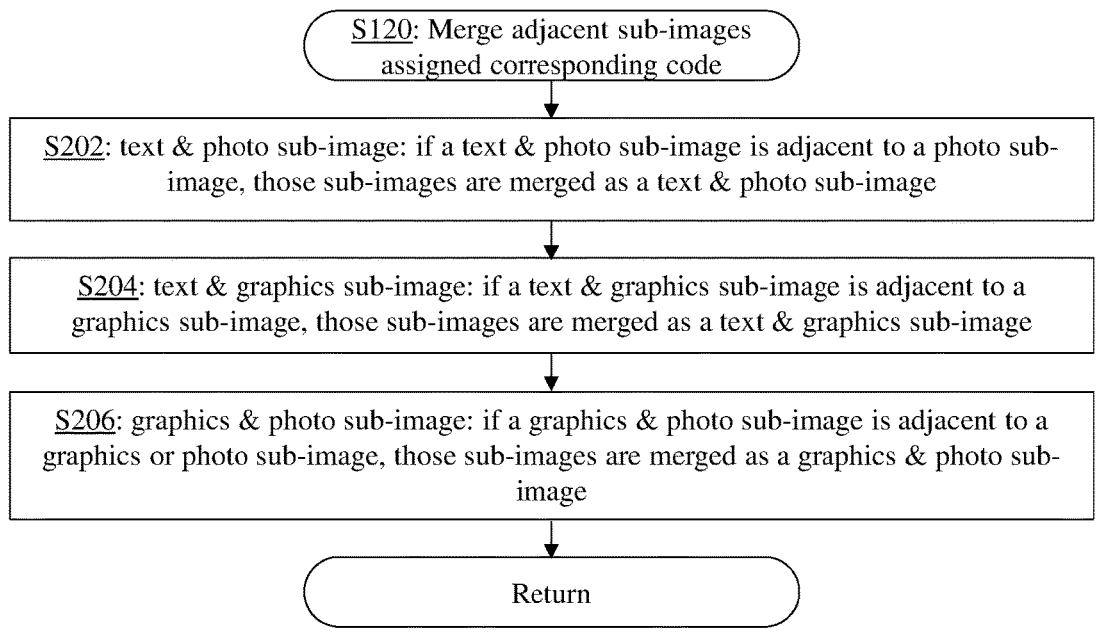
Figure 3:
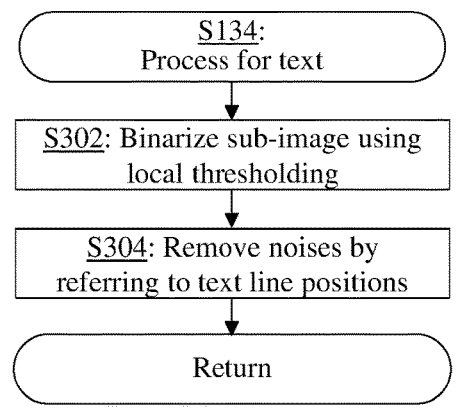
Figure 4:
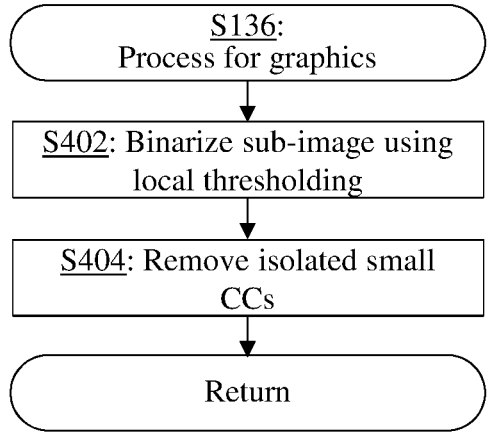
Figure 6:
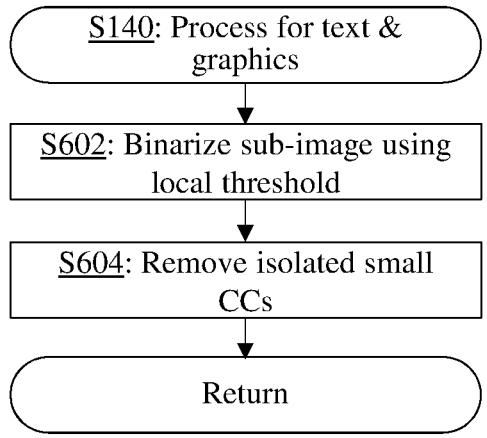
Figure 5:
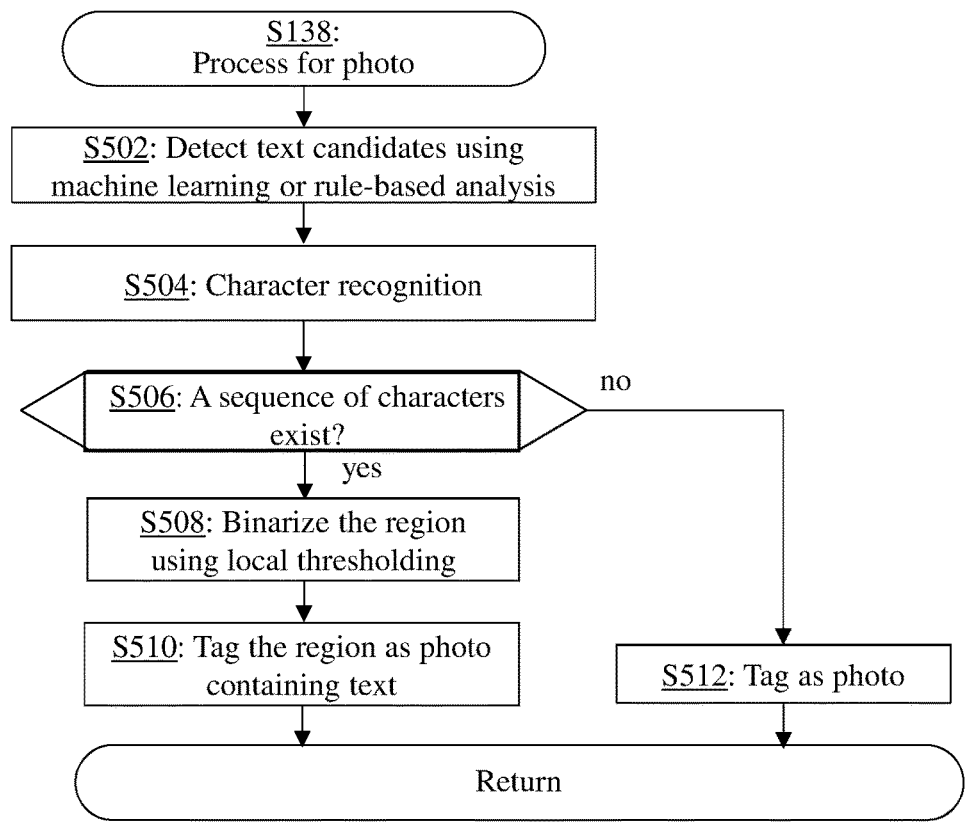
Figure 7:
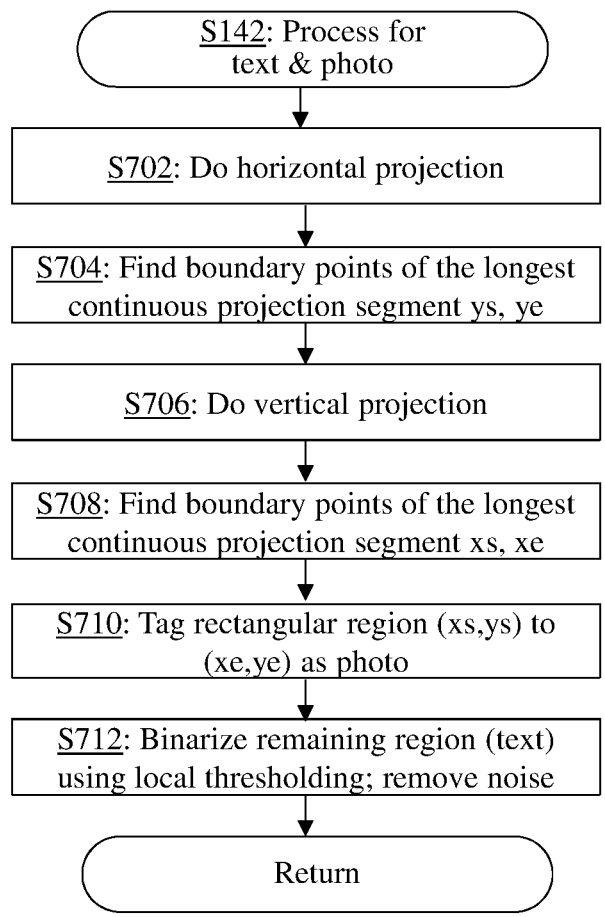
Figure 8:
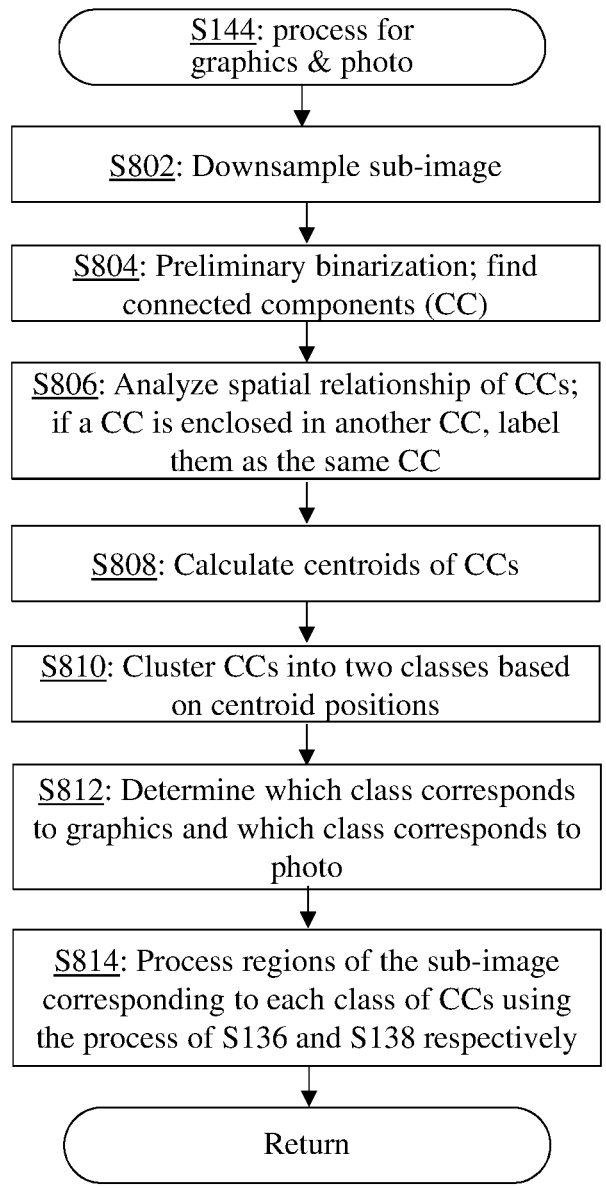
Figure 9:
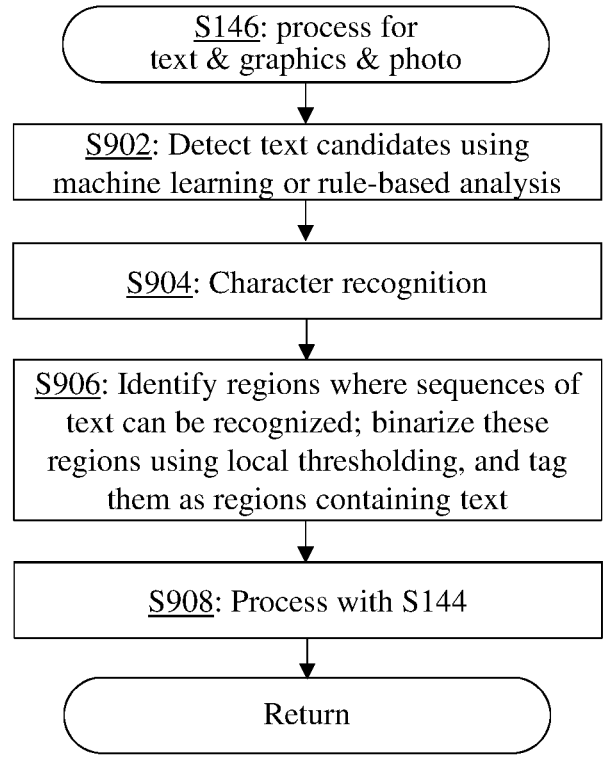

As shown in FIG. 2, in the merging step S120, if a text & photo sub-image is adjacent to a photo sub-image, the two sub-images are merged as a text & photo sub-image (step S202). If a text & graphics sub-image is adjacent to a graphics sub-image, the two sub-images are merged as a text & graphics sub-image (step S204). If a graphics & photo sub-image is adjacent to a graphics sub-image or a photo sub-image, the two sub-images are merged as a graphics & photo sub-image (step S206).

After the two merging steps S118 and S120, each sub-image that is text & photo, text & graphics, graphics & photo, and text & graphics & photo is further divided into second-round sub-images (step S122). This dividing step is similar to step S106. Then, each second-round sub-image is analyzed and assigned one of the codes 1 through 7 designating its type (step S124), in a process similar to steps S110, S112 and S114. Then, a merging step S126 which is similar to the merging steps 118, and another merging step S128 which is similar to the merging steps 120, are performed for the second-round sub-images. Alternatively, the merging steps S126 and S128 may be performed using all sub-images, including those from the first-round dividing step S106, those resulting from the merging steps S118 and S120, and the second-round sub-images from the dividing step S122. In other words, in these alternative merging steps, for example, a sub-image resulting from the second-round dividing step S122 may be merged with a sub-image resulting from the first-round dividing step S106.

Figure 1B:
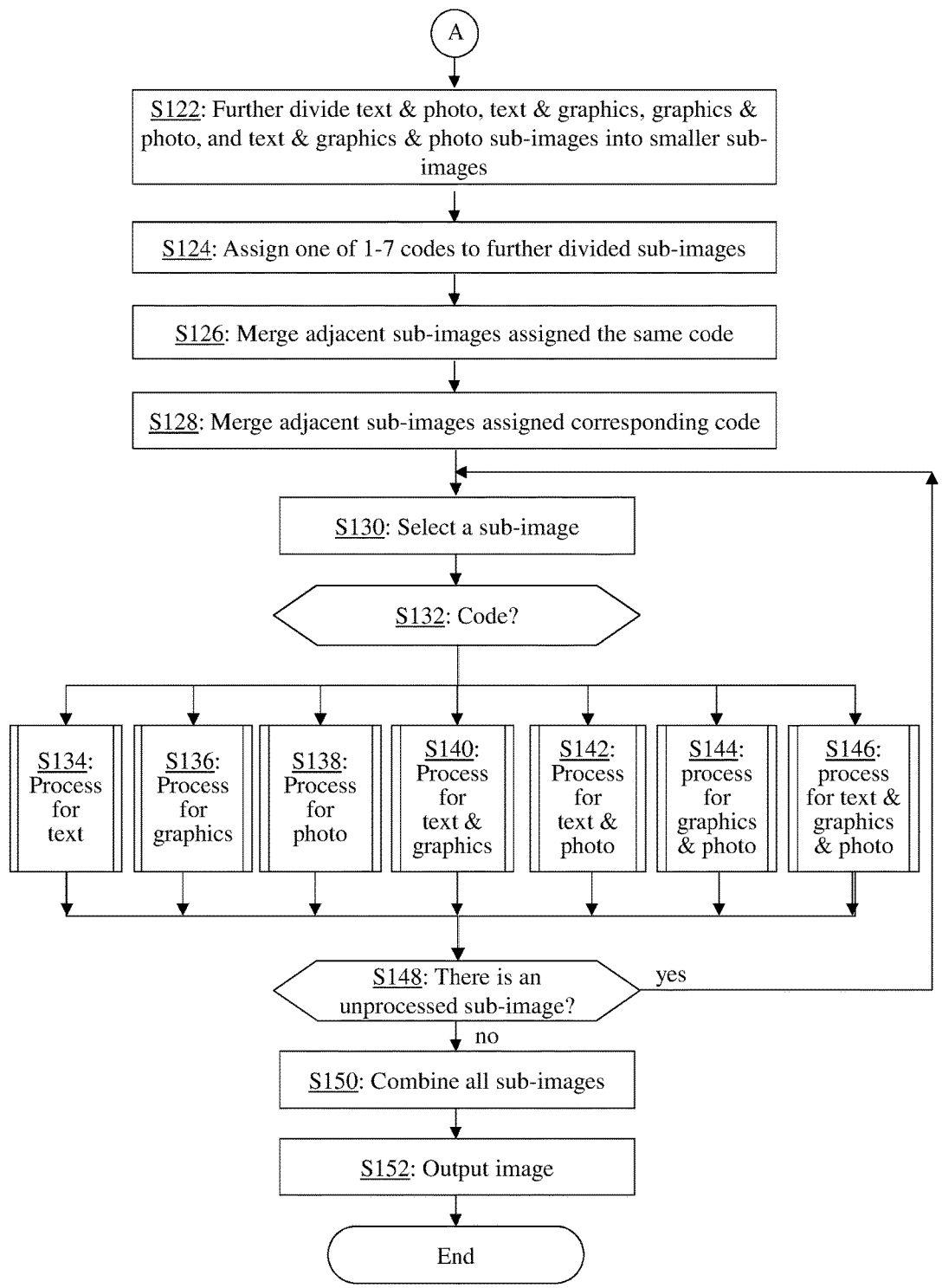

In the process shown in FIGS. 1A and 1B, the cycle of dividing the image, evaluating and assigning type codes to the sub-images, and merging adjacent sub-images is performed twice. Optionally, the cycle may be performed only once, or repeated additional times, especially for larger input images. In another alternative method, the cycle is repeated more times for sub-images that still contain text & graphics & photo after a previous cycle, because this type is the most difficult type to handle.

Thereafter, in steps S130 through S148, each sub-image is processed by one of seven processes depending on the type code assigned to that sub-image. The seven different processes are described in more detail below with reference to FIGS. 3-9.

Generally speaking, for sub-images only containing text, or only containing graphics, or only containing text and graphics, the sub-image can be binarized using a suitable binarization technique, and then the noises in the binary image may be removed. More specifically:

For a sub-image containing only text (step S134, FIG. 3), the sub-image is binarized using a local thresholding method (step S302). Any suitable local thresholding method may be used, such as Niblack, Sauvola, and NICK thresholding. Noises are then removed, by taking advantage of the expectation that spaces between text lines should be free of contents (step S304). More specifically, a connected component analysis is performed on the binary sub-image to obtain all black connected components. A connected component in a binary image is a group of one or more pixels of the same value (e.g. black) that are connected to each other. Connected components that are smaller than a predetermined threshold size and that are located at row locations which correspond to the low (near zero) valleys of the horizontal projection profile are considered noise and removed from the binary sub-image. The threshold size may be a fixed number of pixels, e.g., 5 pixels, or a predefined percentage of a calculated median size of connected components in the sub-image (which is reflective of the typical size of the text characters).

For a sub-image containing only graphics (step S136, FIG. 4), the sub-image is binarized using a local thresholding method (step S402). Then, a connected component analysis is performed on the binary sub-image to obtain all black connected components. Connected components that are smaller than a predetermined threshold size are considered noise and removed from the binary sub-image (step S404). The threshold size may be a fixed number of pixels, e.g., 20 pixels, or a pre-defined percentage of a calculated median size of connected components in the sub-image.

For a sub-image containing only text and graphics (step S140, FIG. 6), the process is similar to that for graphics. I.e., the sub-image is binarized using a local thresholding method (step S602); then, a connected component analysis is performed, and connected components smaller than a predetermined threshold size are considered noise and removed (step S604). Alternatively, for the part of the sub-image corresponding to the first i.e. pulse-like portion of the horizontal projection profile, small connected components are removed only if they are located within the valleys of the horizontal projection profile.

Generally speaking, in this embodiment, the goal for processing photos is to extract any text it may contain, without attempting to binarize other parts of the photo. The reason is that a photo image sometimes contains images of signs, labels, etc. that are formed of text characters, and an attempt is made to recognize such text characters. However, such text within a photo is typically different from the "type 1" text referred to earlier because the text within a photo is often not aligned in a horizontal direction and often does not contain multiple lines of text giving rise to a pulse-like horizontal projection profile. Therefore, a different method is used.

For a sub-image containing only photos (step S138, FIG. 5), the sub-image is first analyzed using machine learning or a rule-based analysis to detect text candidates, i.e., regions of the sub-image that potentially contain text (step S502). Many such analysis methods are known and may be used in this step. One example of rule-based analysis uses edge detection to detect text candidates. Character recognition is then applied to each text candidate region to recognize text characters (step S504). If the character recognition step successfully recognizes a sequence of text characters in a text candidate region ("yes" in step S506), the region is binarized using local binarization (step S508), and is tagged as a region containing text (step S510). The remaining portion of the sub-image (i.e. where no text candidate was detected or where character recognition was unsuccessful) is tagged as photo not containing text (step S512), and it may be binarized or left not binarized.

Generally speaking, the goal for processing sub-images containing both photo and non-photo content (text and/or graphics) is to separate out the photo region, and process the photo and non-photo regions separately. More specifically:

For a sub-image containing only text and photo (step S142, FIG. 7), the horizontal projection profile H(y) is calculated (step S702) (or previously calculated horizontal projection profile is used), and the start and end points (ys, ye) of the longest segment of the horizontal projection profile that is continuous without clear pulse-like peaks and low valleys are identified (step S704). This identifies a horizontal band of the sub-image that contains the photo. For this horizontal band, a vertical projection profile V(x), where x is the pixel position in the horizontal direction, is calculated by counting the number of non-zero pixels, or summing or averaging the pixel values of all pixels, in each vertical column of the horizontal band (step S706). The start and end points (xs, xe) of the longest segment of the vertical projection profile that is continuous without breaks are identified (step S708). This step is based on the fact that text tends to have gaps between characters, so there tends to be x positions that have low values in the vertical projection profile ("breaks"). Here, the threshold for determining the existence of breaks may be, for example, the height of text line.

Then, a rectangular region defined by the start and end positions in the vertical and horizontal direction, (ys, ye) and (xs, xe), is tagged as a photo region (step S710), and the remaining region of the sub-image is tagged as text and is binarized using local thresholding (step S712). Noise removal similar to step S304 may also be performed. Preferably, for the region tagged as photo, a photo processing step similar to step S138 is applied to identify any text in it and binarize such regions. Alternatively, the region tagged as photo may be binarized as is, or left not binarized.

For a sub-image containing only graphics and photo (step S144, FIG. 8), the sub-image is first downsampled (step S802). This step is optional and is for the purpose of increasing processing speed. Then, the sub-image is binarized to generate a preliminary binary sub-image, and a connected component analysis is performed to identify connected components in the preliminary binary sub-image (step S804). Note that the preliminary binary sub-image may be generated using global or local thresholding; it is not intended to be a high quality binary image but only used to generate connected components for subsequent analysis. The spatial relationships of connected components are analyzed; if a connected component is enclosed inside another connected component, the two connected components are labeled as the same connected components (step S806). This reduces the number of connected components while capturing those located at outer boundaries of the graphics and photo. Step S806 is optional.

The centroids of the connected components are calculated (step S808), and the connected components are clustered into two classes based on their centroid positions (step S810). Any suitable clustering algorithm may be used, such as k-means clustering. The connected components for each class is deemed to correspond to one content object of the sub-image, one being graphics, one being photo. A determination of which class corresponds to the graphics and which class corresponds to the photo is made by comparing the densities of the corresponding regions of the sub-image containing the two classes (step S812). More specifically, for each class of connected components, the density of a region (e.g. a rectangular bounding box) that contains all connected components of that class is calculated. The class of connected components that gives a higher calculated density is deemed to correspond to the photo and the class that gives a lower calculated density is deemed to correspond to the graphics (step S812). The densities may be calculated using either the preliminary binary sub-image or the original grayscale sub-image. Then, the grayscale sub-image is divided into two regions, respectively corresponding to the two classes of connected components, and the two regions are processed using the process of steps S136 (process for graphics) and S138 (process for photo), respectively (step S814).

Note that the clustering step described above assumes that the sub-image has two content objects, one graphic and one photo. It is also possible to cluster the connected components into more than two classes in step S810, and steps S812 and S814 can be modified accordingly.

For a sub-image containing text, graphics and photo (step S146, FIG. 9), the sub-image is first analyzed using machine learning or a rule-based analysis to detect text candidates, i.e., regions of the sub-image that potentially contain text (step S902). This step is similar to step S502, but it will capture both regions of the photo that contain text characters and regions containing text outside of the photo as text candidates. Step S902 may be applied to either the grayscale sub-image, or a preliminary binary image. The same is true for step S502 in process S138.

Character recognition is then applied to each text candidate region to recognize text characters (step S904). If a sequence of text characters can be successfully recognized in a text candidate region, that region is binarized using local binarization and tagged as a region containing text (step S906). All regions that have been successfully recognized and binarized in step S906 are removed from the sub-image, e.g., by setting the pixel values in these regions to white, and the sub-image is then subject to the process of step S144 (FIG. 8), which is the process applied to sub-images containing graphics and photo.

Referring back to FIG. 1B, after all sub-images are processed using the processes of S134 to S146 ("no" in step S148), all sub-images are combined back together (step S150) to form a binary output image (step S152). The combined binary output image will include regions that have been tagged as region containing text and binarized in steps S510 and S906. For regions that are tagged as photo in step S512 and regions that are tagged as photo in step S710 (if further processing of step S138 is not applied to it), if they are not binarized, they may be left blank in the output image, and a place holder may be drawn to indicate such regions.

To summarize, the binarization method described above separates different types of contents and processes them using different binarization processes. Simple and fast binarization techniques are applied to sub-images containing text and/or graphics but does not contain photo, so the more complex techniques for processing photo are applied to only the sub-images that require such processing.

Figure 10:
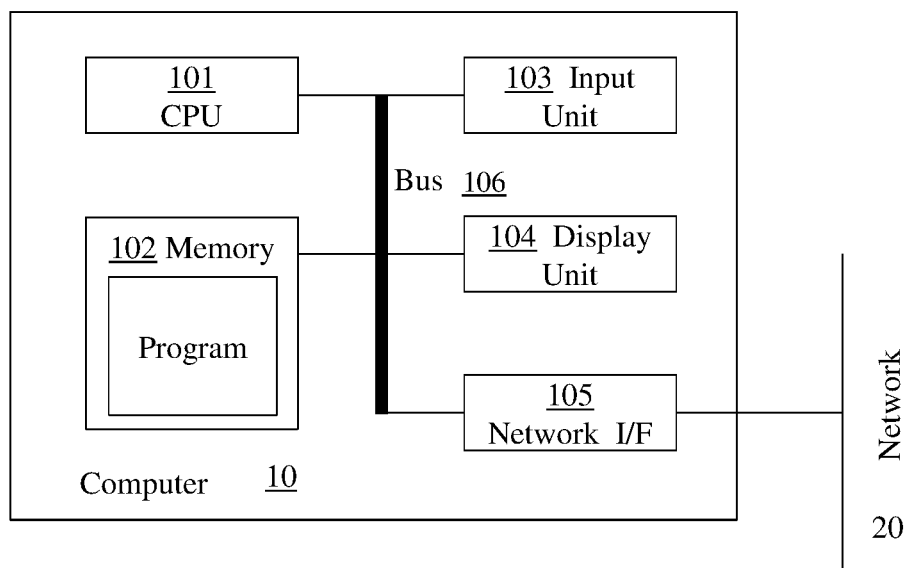
FIG. 10 schematically illustrates a data processing apparatus in which embodiments of the present invention may be implemented.

The document image binarization methods described here can be implemented in a data processing system such as a computer 10 as shown in FIG. 10. The computer 10 comprises a processor (CPU) 101, a memory 102 which stores software programs, where the programs are executed by the processor 101 to carry out the described methods. The computer 10 may optionally contain an input unit 103, a display 104, and a network interface 105 for communicating over a network 20.

It will be apparent to those skilled in the art that various modification and variations can be made in the document image binarization method and related apparatus of the present invention without departing from the spirit or scope of the invention. Thus, it is intended that the present invention cover modifications and variations that come within the scope of the appended claims and their equivalents.

What is claimed is:

1. A method for binarizing a grayscale document image, comprising:
   (a) dividing the document image into a plurality of sub-images and determining a type of each sub-image, including:
      (a1) dividing the document image into a plurality of sub-images without regard to its content;
      for each sub-image:
      (a2) calculating a horizontal projection profile as a function of vertical pixel position, which represents either a number of pixels darker than a threshold darkness in each row of pixels of the sub-image or a sum or average of pixel values of each row of pixels;

(a3) calculating a density of the sub-image, which represents either a ratio of a number of pixels darker than a threshold darkness to a total number of pixels in the sub-image or an average of pixel values of the sub-image; and (a4) based on the horizontal projection profile and the density, determining the sub-image as being one of: a first type which contains only text content, a second type which contains only graphics content, a third type which contains only photo content, a fourth type which contains only text and graphics contents, a fifth type which contains only text and photo contents, a sixth type which only contains graphics and photo contents, and a seventh type which contains text and graphics and photo contents; and (b) based on the type of each sub-image as determined in step (a), applying a selected one of first to seventh binarization processes to binarize the sub-image to generate a binary sub-image, the first to seventh binarization processes respectively adapted for binarizing sub-images of the first to seventh types, wherein at least the first, second, third, fifth, sixth and seventh binarization processes are different from each other; and (c) combining all binary sub-images to generate a binary image of the grayscale document image.

2. The method of claim 1, wherein step (a4) includes:

if the horizontal projection profile has alternating pulse-like peaks and valleys with substantially uniform widths respectively, and has no part that contains a continuous non-zero curve, the sub-image is determined to be the first type that contains only text content;

if the horizontal projection profile is a continuous curve without alternating pulse-like peaks and valleys, and the density is below a predetermined density threshold, the sub-image is determined to be the second type that contains only graphics content;

if the horizontal projection profile is a continuous curve without alternating pulse-like peaks and valleys, and the density is above the predetermined density threshold, the sub-image is determined to be the third type that contains only photos content;

if the horizontal projection profile has a first portion that has alternating pulse-like peaks and valleys with substantially uniform widths respectively, and has a second portion that is a continuous curve without alternating pulse-like peaks and valleys, and if a density of a part of the sub-image corresponding to the second portion of the horizontal projection profile is below the predetermined density threshold, the sub-image is determined to be the fourth type that contains only text and graphics contents;

if the horizontal projection profile has a first portion that has alternating pulse-like peaks and valleys with substantially uniform widths respectively, and has a second portion that is a continuous curve without alternating pulse-like peaks and valleys, and if a density of a part of the sub-image corresponding to the second portion of the horizontal projection profile is above the predetermined density threshold, the sub-image is determined to be the fifth type that contains only text and photo contents;

if the horizontal projection profile has no portion that has alternating pulse-like peaks and valleys, and has two distinctive portions that have significantly different heights, the sub-image is determined to be the sixth type that contains only graphics and photo contents; and if the horizontal projection profile has a portion that has alternating pulse-like peaks and valleys with substantially uniform widths respectively, and a remaining part of the horizontal projection profile has two distinctive portions that have significantly different heights, the sub-image is determined to be the seventh type that contains text, graphics and photo contents.

3. The method of claim 2, wherein in step (b), the first binarization process selected for binarizing sub-images of the first type which contains only text content includes:

binarizing the sub-image using local thresholding;

performing a connected component analysis to obtain all foreground connected components; and removing all connected components that are smaller than a threshold size and are located at row locations which correspond to the valleys of the horizontal projection profile.

4. The method of claim 2, wherein in step (b), the second binarization process selected for binarizing sub-images of the second type which contains only graphics content includes:

binarizing the sub-image using local thresholding;

performing a connected component analysis to obtain all foreground connected components; and removing all connected components that are smaller than a threshold size.

5. The method of claim 2, wherein in step (b), the third binarization process selected for binarizing sub-images of the third type which contains only photo content includes:

detecting text candidate regions from the sub-image using machine learning or rule-based analysis;

performing character recognition for each of the detected text candidate regions;

for each of the detected text candidate regions where a sequence of characters is successfully recognized in the character recognition step, binarizing the text candidate region using local thresholding and tagging the region as photo containing text;

tagging all areas of the sub-image outside of the text candidate regions where sequences of characters are successfully recognized as photo not containing text.

6. The method of claim 2, wherein in step (b), the fourth binarization process selected for binarizing sub-images of the fourth type which contains only text and graphics contents includes:

binarizing the sub-image using local thresholding;

performing a connected component analysis to obtain all foreground connected components; and removing all connected components that are smaller than a threshold size.

7. The method of claim 2, wherein in step (b), the fifth binarization process selected for binarizing sub-images of the fifth type which contains only text and photo contents includes:

in the horizontal projection profile, identifying a longest continuous segment and determining its boundary points;

for a horizontal band of the sub-image that corresponds to the longest continuous segment of the horizontal projection profile, calculating a vertical projection profile as a function of horizontal pixel position, which represents either a number of pixels darker than a threshold darkness in each column of pixels of the band or a sum or average of pixel values of each column of pixels;

identifying a longest continuous segment in the vertical projection profile and determining its boundary points;

tagging a rectangular region defined by the boundary points determined in the horizontal projection profile and the boundary points determined in the vertical projection profile as photo; and binarizing areas of the sub-image outside of the rectangular region using local thresholding and tagging the areas as text.

8. The method of claim 2, wherein in step (b), the sixth binarization process selected for binarizing sub-images of the sixth type that contains only graphics and photo contents includes:

binarizing the sub-image to generate a preliminary binary sub-image;

identifying connected components in the preliminary binary sub-image;

performing a clustering operation to cluster the connected components into two classes based on their centroid positions;

determining which of the two classes of connected components corresponds to the graphics content and which corresponds to the photo content, by comparing densities of two regions of the sub-image that respectively contain the connected components of the two classes; and dividing the sub-image into two areas respectively corresponding to the two classes of connected components, and processing the two areas respectively using the second binarization process and the third binarization process.

9. The method of claim 2, wherein in step (b), the seventh binarization process selected for binarizing sub-images of the seventh type that contains text, graphics and photo contents includes:

detecting text candidate regions from the sub-image using machine learning or rule-based analysis;

performing character recognition for each of the detected text candidate regions;

for each of the detected text candidate regions where a sequence of characters is successfully recognized in the character recognition step, binarizing the text candidate region using local thresholding and tagging the region as photo containing text; and processing all areas of the sub-image outside of the text candidate regions where sequences of characters are successfully recognized using the sixth binarization process.

10. The method of claim 1, wherein step (a) further comprises, after step (a4):

(a5) selectively merging adjacent sub-images, including:
merging any adjacent sub-images of the same type into one sub-image of that type;
merging any adjacent sub-images of the fifth type and the third type as one sub-image of the fifth type;
merging any adjacent sub-images of the fourth type and the second type as one sub-image of the fourth type; and
merging any adjacent sub-images of the sixth type and the second or third type as one sub-image of the sixth type; and thereafter, for each sub-image of the fourth, fifth, sixth and seventh type, repeating steps (a1) through (a5).

11. A computer program product comprising a computer usable non-transitory medium having a computer readable program code embedded therein for controlling a data processing apparatus, the computer readable program code configured to cause the data processing apparatus to execute a process for binarizing a grayscale document image, the process comprising:

(a) dividing the document image into a plurality of sub-images and determining a type of each sub-image, including:

(a1) dividing the document image into a plurality of sub-images without regard to its content;

for each sub-image:

(a2) calculating a horizontal projection profile as a function of vertical pixel position, which represents either a number of pixels darker than a threshold darkness in each row of pixels of the sub-image or a sum or average of pixel values of each row of pixels;

(a3) calculating a density of the sub-image, which represents either a ratio of a number of pixels darker than a threshold darkness to a total number of pixels in the sub-image or an average of pixel values of the sub-image; and (a4) based on the horizontal projection profile and the density, determining the sub-image as being one of: a first type which contains only text content, a second type which contains only graphics content, a third type which contains only photo content, a fourth type which contains only text and graphics contents, a fifth type which contains only text and photo contents, a sixth type which only contains graphics and photo contents, and a seventh type which contains text and graphics and photo contents; and (b) based on the type of each sub-image as determined in step (a), applying a selected one of first to seventh binarization processes to binarize the sub-image to generate a binary sub-image, the first to seventh binarization processes respectively adapted for binarizing sub-images of the first to seventh types, wherein at least the first, second, third, fifth, sixth and seventh binarization processes are different from each other; and (c) combining all binary sub-images to generate a binary image of the grayscale document image.

12. The computer program product of claim 11, wherein step (a4) includes:

if the horizontal projection profile has alternating pulse-like peaks and valleys with substantially uniform widths respectively, and has no part that contains a continuous non-zero curve, the sub-image is determined to be the first type that contains only text content;

if the horizontal projection profile is a continuous curve without alternating pulse-like peaks and valleys, and the density is below a predetermined density threshold, the sub-image is determined to be the second type that contains only graphics content;

if the horizontal projection profile is a continuous curve without alternating pulse-like peaks and valleys, and the density is above the predetermined density threshold, the sub-image is determined to be the third type that contains only photos content;

if the horizontal projection profile has a first portion that has alternating pulse-like peaks and valleys with substantially uniform widths respectively, and has a second portion that is a continuous curve without alternating pulse-like peaks and valleys, and if a density of a part of the sub-image corresponding to the second portion of the horizontal projection profile is below the predetermined density threshold, the sub-image is determined to be the fourth type that contains only text and graphics contents;

if the horizontal projection profile has a first portion that has alternating pulse-like peaks and valleys with substantially uniform widths respectively, and has a second portion that is a continuous curve without alternating pulse-like peaks and valleys, and if a density of a part of the sub-image corresponding to the second portion of the horizontal projection profile is above the predetermined density threshold, the sub-image is determined to be the fifth type that contains only text and photo contents;

if the horizontal projection profile has no portion that has alternating pulse-like peaks and valleys, and has two distinctive portions that have significantly different heights, the sub-image is determined to be the sixth type that contains only graphics and photo contents; and if the horizontal projection profile has a portion that has alternating pulse-like peaks and valleys with substantially uniform widths respectively, and a remaining part of the horizontal projection profile has two distinctive portions that have significantly different heights, the sub-image is determined to be the seventh type that contains text, graphics and photo contents.

13. The computer program product of claim 12, wherein in step (b), the first binarization process selected for binarizing sub-images of the first type which contains only text content includes:

binarizing the sub-image using local thresholding;
performing a connected component analysis to obtain all foreground connected components; and
removing all connected components that are smaller than a threshold size and are located at row locations which correspond to the valleys of the horizontal projection profile.

14. The computer program product of claim 12, wherein in step (b), the second binarization process selected for binarizing sub-images of the second type which contains only graphics content includes:

binarizing the sub-image using local thresholding;
performing a connected component analysis to obtain all foreground connected components; and
removing all connected components that are smaller than a threshold size.

15. The computer program product of claim 12, wherein in step (b), the third binarization process selected for binarizing sub-images of the third type which contains only photo content includes:

detecting text candidate regions from the sub-image using machine learning or rule-based analysis;
performing character recognition for each of the detected text candidate regions;
for each of the detected text candidate regions where a sequence of characters is successfully recognized in the character recognition step, binarizing the text candidate region using local thresholding and tagging the region as photo containing text;
tagging all areas of the sub-image outside of the text candidate regions where sequences of characters are successfully recognized as photo not containing text.

16. The computer program product of claim 12, wherein in step (b), the fourth binarization process selected for binarizing sub-images of the fourth type which contains only text and graphics contents includes:

binarizing the sub-image using local thresholding;
performing a connected component analysis to obtain all foreground connected components; and
removing all connected components that are smaller than a threshold size.

17. The computer program product of claim 12, wherein in step (b), the fifth binarization process selected for binarizing sub-images of the fifth type which contains only text and photo contents includes:

in the horizontal projection profile, identifying a longest continuous segment and determining its boundary points;
for a horizontal band of the sub-image that corresponds to the longest continuous segment of the horizontal projection profile, calculating a vertical projection profile as a function of horizontal pixel position, which represents either a number of pixels darker than a threshold darkness in each column of pixels of the band or a sum or average of pixel values of each column of pixels;
identifying a longest continuous segment in the vertical projection profile and determining its boundary points;
tagging a rectangular region defined by the boundary points determined in the horizontal projection profile and the boundary points determined in the vertical projection profile as photo; and
binarizing areas of the sub-image outside of the rectangular region using local thresholding and tagging the areas as text.

18. The computer program product of claim 12, wherein in step (b), the sixth binarization process selected for binarizing sub-images of the sixth type that contains only graphics and photo contents includes:

binarizing the sub-image to generate a preliminary binary sub-image;
identifying connected components in the preliminary binary sub-image;
performing a clustering operation to cluster the connected components into two classes based on their centroid positions;
determining which of the two classes of connected components corresponds to the graphics content and which corresponds to the photo content, by comparing densities of two regions of the sub-image that respectively contain the connected components of the two classes; and
dividing the sub-image into two areas respectively corresponding to the two classes of connected components, and processing the two areas respectively using the second binarization process and the third binarization process.

19. The computer program product of claim 12, wherein in step (b), the seventh binarization process selected for binarizing sub-images of the seventh type that contains text, graphics and photo contents includes:

detecting text candidate regions from the sub-image using machine learning or rule-based analysis;
performing character recognition for each of the detected text candidate regions;
for each of the detected text candidate regions where a sequence of characters is successfully recognized in the character recognition step, binarizing the text candidate region using local thresholding and tagging the region as photo containing text; and processing all areas of the sub-image outside of the text candidate regions where sequences of characters are successfully recognized using the sixth binarization process.

20. The computer program product of claim 11, wherein step (a) further comprises, after step (a4):
(a5) selectively merging adjacent sub-images, including:
   merging any adjacent sub-images of the same type into one sub-image of that type;
   merging any adjacent sub-images of the fifth type and the third type as one sub-image of the fifth type;
   merging any adjacent sub-images of the fourth type and the second type as one sub-image of the fourth type; and
   merging any adjacent sub-images of the sixth type and the second or third type as one sub-image of the sixth type; and
thereafter, for each sub-image of the fourth, fifth, sixth and seventh type, repeating steps (a1) through (a5).

* * * * *